May 9, 1944.  F. M. POOLE  2,348,643
MEASURING INSTRUMENT
Filed Oct. 7, 1942  3 Sheets-Sheet 1
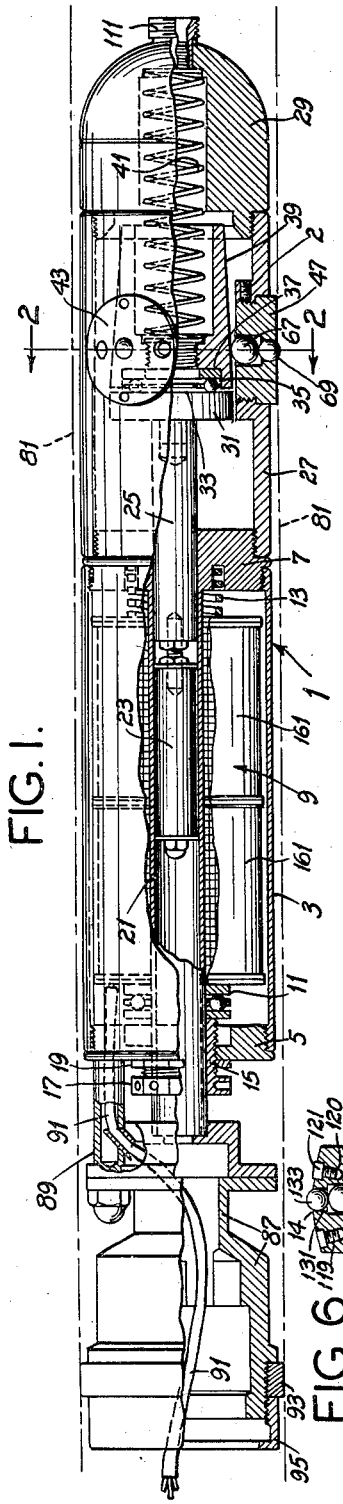
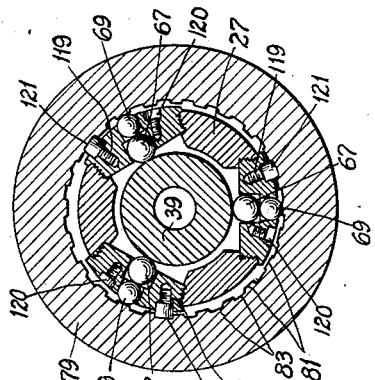
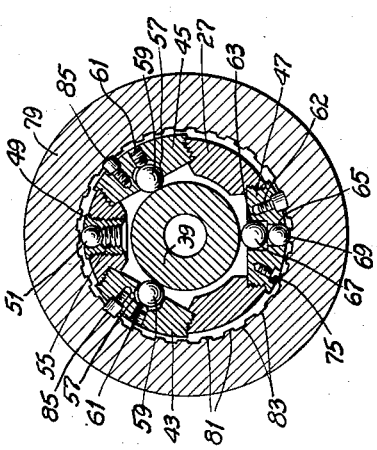
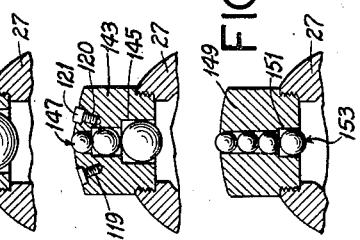
Foster M. Poole,
Inventor.
Haynes and Koenig
Attorneys.

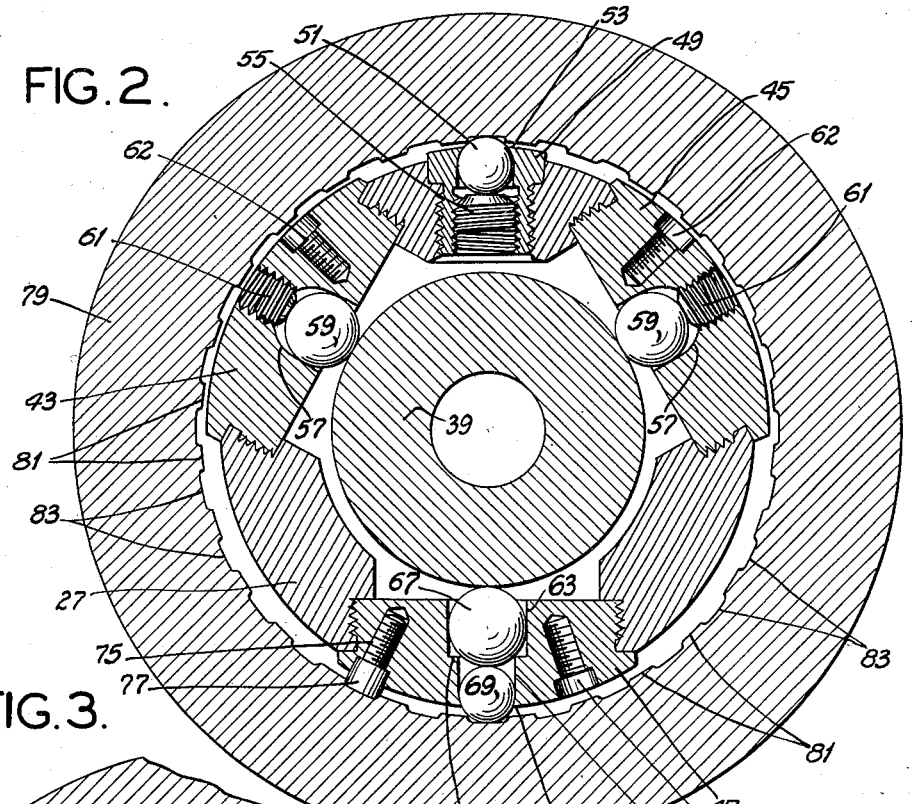
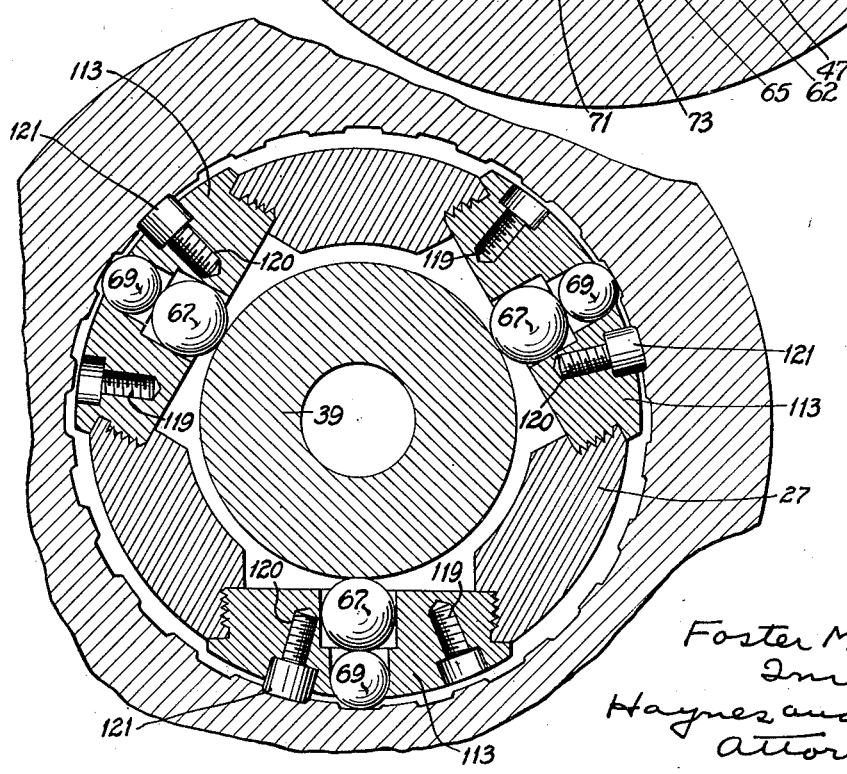

Foster M. Poole,
Inventor.
Haynes and Koenig
Attorneys.

Patented May 9, 1944

2,348,643

UNITED STATES PATENT OFFICE 2,348,643

MEASURING INSTRUMENT

Foster M. Poole, Dallas, Tex.

Application October 7, 1942, Serial No. 461,101

12 Claims. (Cl. 33—178)

This invention relates to measuring instruments, and with regard to certain more specific features, to an internal tube caliper for making inside measurements within cylinders, such as guns, recoil barrels, tubes and the like.

Among the several objects of the invention may be noted the provision of a measuring instrument for more accurately and quickly making and indicating measurements within either smooth or grooved cylinders, either by means of two-point or three-point measurements; the provision of an instrument of the class described by which a constant feeler pressure may be maintained or released as desired without the necessity for any critical human judgment, whereby accuracy is increased; and the provision of an instrument of this class which is simple and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a longitudinal section of my new measuring instrument;

Fig. 2 is an enlarged vertical cross section taken on line 2—2 of Fig. 1, showing an organization of parts for making two-point groove measurements in barrels having a number of grooves divisible by two;

Fig. 3 is a fragmentary view similar to Fig. 2, but showing an arrangement for making three-point groove measurements in barrels having a number of grooves divisible by three;

Figs. 4 and 5 are views similar to Figs. 2 and 3, respectively, but on a smaller scale, showing how similar measurements are made upon the lands of the respective rifles;

Figs. 6, 7 and 8 are fragmentary details showing various feeler train adapters;

Similar reference characters indicate corresponding parts throughout the several views of the drawings.

Figure 10:
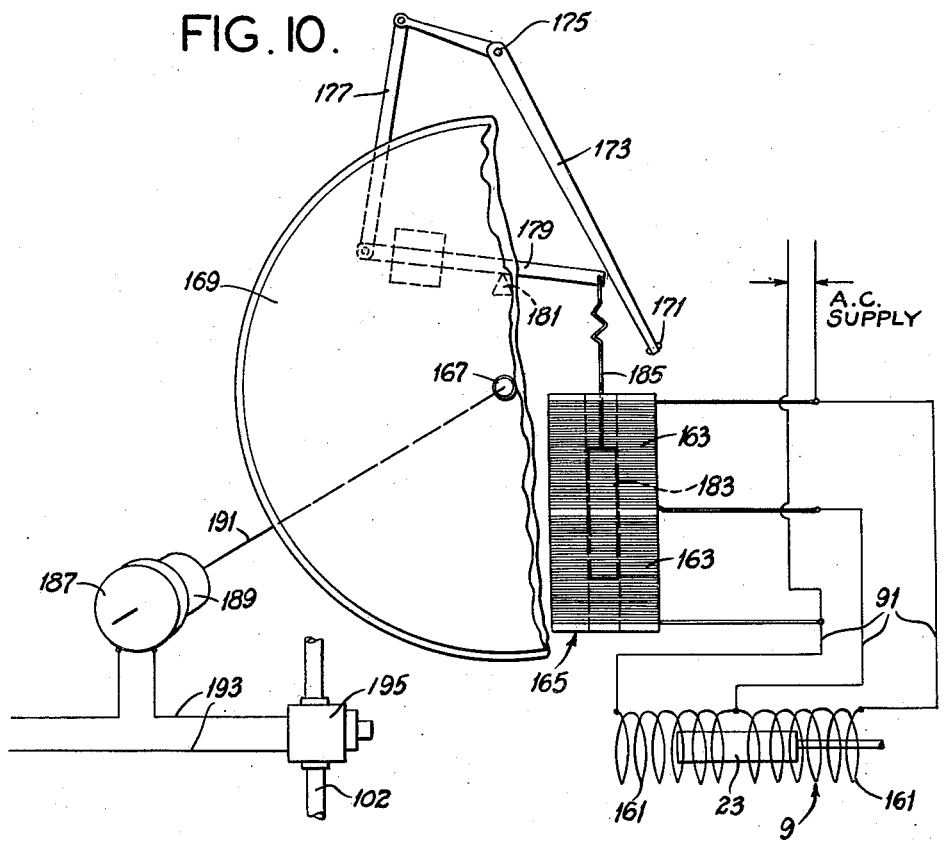
Fig. 10 is a diagrammatic view of a continuous reading indicator.

In Roberts United States Patent 2,235,533, dated March 18, 1941, is shown measuring apparatus over which the present construction is an improvement. Roberts shows a mechanical feeler transmitter and an electrical receiver for translating mechanical movement into movement on an electrical indicator. In general, a voltmeter is connected across a balanced Wheatstone bridge. The Wheatstone bridge is adapted to indicate quantitatively an unbalanced condition brought about by inductive variations in a solenoid coil in the mechanical transmitter. The variations in conditions of said coil are obtained by causing measuring feelers in the mechanical transmitter to actuate an armature carried in the transmitter, the armature cooperating with said coil to effect said electromagnetic variations. Unbalance is thus brought about in the electrical bridge and this causes the voltmeter to change its readings, thus indicating variations registered by the feelers. The bridge circuit may be entirely inductive, as is described in connection with Fig. 10 herein.

Referring now more particularly to Fig. 1, the guide body of the transmitter is indicated as a whole by the numeral 1. This is made up of a rear container cylinder 3 having enclosing heads 5 and 7, a forward cylinder 27 with a hemispherical nose 29, and a rearward manifold 87 carrying a guide ring 93. Within the cylinder 3 is the transmitter coil 9 consisting of two bridge coils 161. These coils may be in the bridge circuit shown in Fig. 10. This coil 9 surrounds a tube 21 extending from head 7 and is pressed against an end-thrust bearing 11 by means of a spring 13. The spring 13 reacts from the head 7 and the thrust bearing 11 is supported by means of an adjustable bushing 15 threaded through the opposite head 5. The bushing 15 has a wrench-engaging head 17 for cooperation with an adjusting wrench, and it is adapted to be locked in a given adjusted position by a locknut 19.

The bushing 15 surrounds the tubular extension 21 which passes entirely through the container 3 from the head 7. The coil 9 slides on this tube 21. Within the tube 21, which is nonmagnetic bearing bronze, is a soft-iron magnetic armature 23 which is fastened to a rod 25 sliding in the head 7. The rod 25 has an air seal in the cylinder 21, and air pressure let into the tube 21 biases the rod 25 outward (toward the right in Fig. 1).

Fastened to the head 7 is the second container cylinder 27, which at its right-hand end is enclosed by the hemispherical nose 29. Within the cylinder 27 is a circular platen 31, the face 33 of which is machined flat and perpendicular to the center line of the apparatus. It contacts one side of a thrust bearing 35 carried within a recess 37 in a smooth hardened cone 39. The cone 39 is normally biased into position against the thrust bearing 35 by means of a retriever spring 41, the latter reacting from the end of the nose 29.

Threaded at 120° intervals in the plane 2—2 are bushings 43, 45 and 47. A fourth and smaller bushing is indicated at 49. The small bushing 49 is counterbored to receive a steel ball 51, which, due to an outer lip 53, cannot escape. It extends a distance from the end of the bushing 49. The ball is held in place axially by a threaded plug 55 but the plug is adjusted to allow ball rotation. The bushings 43 and 45 have partially cylindric recesses 57 into which are fitted from the inside steel balls 59 held outside by threaded limiting stop plugs 61. These balls are linearly immovable in recesses 57, although they are rotary. The bushings 43 and 45 also carry outside threaded recesses 62 for purposes to be made clear. The other bushing 47 has a stepped-bore opening therethrough, indicated at 63 and 65. The larger, inner bore or recess 63 carries a movable ball 67 and the outer recess 65 carries a movable ball 69. In the outermost position, the ball 67 rests on a shoulder 71 between the bores 63 and 65, and the ball 69 rests upon a lip 73, and (like balls 59) extends some distance beyond said lip, as shown. This bushing 47 also has a recess 62 corresponding to the recesses 62 in the bushings 43 and 45; and in addition it carries a recess 75 containing a guide plug 77.

In Figs. 2 and 4 the form of the transmitter just described is shown in a grooved gun barrel 79, the inside diameter of which on the lands 81 is indicated by dotted lines in Fig. 1. The grooves are indicated at 83.

The barrel shown in Fig. 2 has twenty-eight lands 81 and twenty-eight grooves 83. This is representative of any gun barrels of the class having a number of lands or grooves divisible by two and measurable by diametral two-point contact. It will be seen from Fig. 2 that the plug 77 is arranged to traverse a groove, and is so angularly related with respect to the balls 51 and 69 that said balls ride in opposite grooves to make a diametral measurement between grooves angularly related at 180°.

In Fig. 4 is shown a similar arrangement, like numerals designating like parts, except that the plug 77 has been removed from opening 75 in the bushing 47 and has been placed in the opening 62 in said bushing. Thus when said plug 77 is then positioned in the groove of a barrel having twenty-eight lands and twenty-eight grooves (divisible by two), this will place the balls 51 and 69 on opposite lands 81. A barrel having twenty-eight lands and twenty-eight grooves is representative of those whose number of lands or grooves is divisible by two. In addition, in this Fig. 4 case, plugs 85 are placed in the openings 62 in the bushings 43 and 45 and these ride in grooves to effect additional guiding.

From the above it will be seen that by moving the cone 39 toward the right in Fig. 1 it may be caused to effect a three-point wedge between the balls 59 and 67, and that any relative motion of the ball 69 with respect to the ball 51, such as may be caused by non-parallel conditions in the opposite lands or grooves, will cause axial movement of the cone 39. That is to say, balls 51 and 59 constitute a branched feeler ball train from one groove (or land) to the cone 39 and the balls 69 and 67 constitute a direct feeler ball train from an opposite groove (or land) to said cone 39. In order to obtain train-expanding pressure between the cone 39 and the surrounding balls 59 and 67, air pressure is communicated to the inside of the tube 21, thereby biasing the piston 25 outward, so that the table 33 presses upon the bearing 35 and it in turn presses upon the cone 39. This air pressure is brought to the tube 21 through the inlet manifold 87 which is mounted upon the head 5 by means of spacing pillars 89. One of the spacing pillars 89 is hollow for carrying a lead wire 91 from the coil 9. Around the manifold 87 is the circular guide ring 93 held in place by a head 95, which ring slidingly fits the inside of barrel 79.

Figure 9:
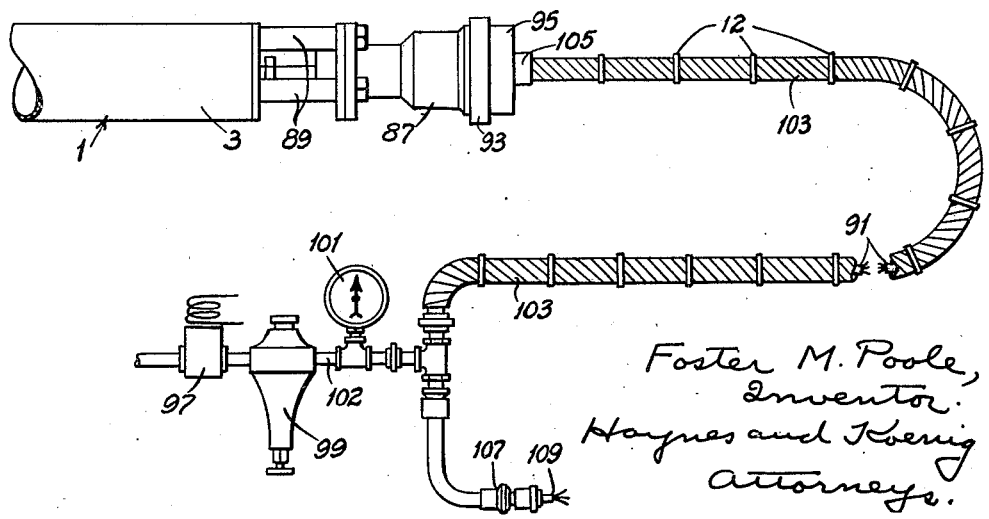
Fig. 9 is a diagram showing certain pneumatic and electrical connections.

The manifold 87 is shaped so as to form a quick-detachable coupling with a plug 105 of a flexible pneumatic hose 103 carrying a three-wire electric cable 91 (Fig. 9). A control and relief valve is indicated at 97, a pressure regulator and filter at 99, and a gauge at 101 on an air feed pipe 102. These feed air to the flexible hose 103. The plug 105 is held by a collar 95. The electrical wire 91 passes through the air hose 103 and out through a suitable air-tight plug 107 to the wires 109 which connect to complete the electrical bridge. The valve 97 may be of the remotely controlled solenoid type. An exemplary air pressure is 45 lbs. per sq. in., although this is not to be taken as limiting, because it depends upon the angle of the cone 39 and the desired feeler pressure.

As indicated in Fig. 1, each bushing is held by a set screw 2.

It will be observed that the body 1 is free to move laterally with respect to the measuring cone 39, which is floating within the inner ball circle. The converse is also true. The flat platen 33 accommodates such lateral movement of the cone without transmission of any movement to the armature 23. Thus, the cone floats and makes the transmitter independent of its lateral position in the tube or cylinder, and the same axial position of the cone 39 is obtained irrespective of whether the transmitter is on the bottom of the tube or concentric with it. The three-point contact between the balls 59, 67 and the cone 39 holds the axis of the cone 39 parallel to the axis of the cylinders 3 and 27, regardless of whether or not these axes are coincident. Also, the axes of the cone and of the barrel which are being measured are always parallel.

Operation is as follows:

If not already set, the coil 9 may be adjusted to obtain zero setting of the bridge indicator for a given barrel. This is done from the adjusting bushing 15 by suitably positioning the coil with respect to the armature 23 when the latter is in a zero reference position.

The valve 97 is set so as to shut off the air supply and release the air pressure in the cylinder 21. The return spring 41 then biases the cone 39 from the feeler ball train 67, 69 and from the balls 59. This allows for the easy insertion of the whole of the transmitter 1 into the gun barrel. It is pushed through to the end. The air is then turned on, which forces the cone 39 against the balls 67 and 59, and forces the feeler ball train 69 and 51 outward. The transmitter is then slowly withdrawn, whereupon the balls 59 and 61 roll in the grooves or on the lands as the case may be in Figs. 2 and 4 respectively. Any irregularities are detected by the balls 51 and 69 being moved relatively, which in turn causes reactions on all three balls 67 and 59 inwardly so that there is a tendency to push the cone 39 axially to the left against the constant air pressure. The advantage of having air pressure force the balls outward is in its independence of any human element in "feeling." The advantage of the balls themselves is their free-rolling characteristics. The idea of the feeler ball train allows for flexibility in design, as will appear. If desired, the cable which feeds the transmitter into the gun barrel may be calibrated along its length as shown at 12, so that the positions of any irregularities may be plotted. Or if the opposite end of the barrel is open, a suitably calibrated measuring extension may be applied to the universal joint socket shown at 111. A calibrated rigid pipe section may also be used for this purpose at the end of line 103 near the transmitter.

Axial motion of the rod 25 in response to axial motion of the cone 39 results in axial motion of the soft-iron armature 23. This changes the inductive characteristics of the coil 9 which unbalances the bridge circuit in which the coil is located, and the associated indicator indicates the unbalance. The indicator is calibrated in terms of the dimensional variations required to give a certain unbalance. Thus the indicator gives an indication of diametral variations in the barrel 79.

Figs. 3 and 5 show a construction similar to the above, except that three-point, or so-called star-gauge, readings are obtained in barrels having numbers of lands and grooves divisible by three. Like numerals designate like parts. As indicated in Fig. 3, the bushing 49 is eliminated, and a different set of the 120° bushings is used. Numeral 113 has been applied to each of these, all of them being alike in this case.

Each bushing 113, besides having feeler ball trains 67 and 69 supported therein, as before, carries screw holes 119 and 120. Plugs 121 are used in the openings 120, so as to ride in grooves 120° apart, as indicated in Fig. 3. This places the outer balls 69 in three grooves, spaced at 120°.

In order to make a three-point contact on the lands, the plugs 121 may be removed and placed in the openings 119, as indicated in Fig. 5. This has the effect of placing the three balls 69 on lands at 120° apart so as to effect land measurement.

In order to make three-point measurement by three-point contact in barrels that are substantially larger than the transmission unit 1, the adapter bushings shown in Figs. 6 and 7 are used. For example, in Fig. 6, the adapter bushing carries the numeral 123 and is screwed home in the body 27 in place of the bushings already described. This bushing 123 has four stepped recesses 125, 127, 129 and 131 increasing in size inwardly and carrying a train of progressively sized feeler balls 133, 137, 139 and 141, held by a lip 14. This extends the range of the instrument without sacrificing advantages. In Fig. 7 is shown a similar arrangement in the case of a bushing extension 143, having a three-stepped bore 145 for a feeler train of three balls 147.

Figs. 6 and 7 show plugs for three-point measurements but they could also be adapted for two-point measurements, as is clear from the above.

In Fig. 8 is shown a construction for a smooth bore cylinder. In this case, the extension bushing 149 does not carry guide plugs for any grooves and has for example a single step counterbore 151 for a train of balls 153. The main point in this instance is the absence of guide plugs.

When the constructions of Figs. 6–8 are used, correspondingly larger guide flanges are substituted for the flange 93.

From the above, it will be seen that the difference between the three-point measurement and the two-point measurement is that in the former case (Figs. 3 and 4) there are three feeler-ball trains which transmit motion directly to the cone 39. In the latter case there is one direct train 67, 69 (Figs. 2 and 4), the fixed feeler ball 51 transmitting its motion through the cylinder 27 to the spaced balls 59 which engage the cone 39. Thus in both cases three-ball contact on the cone holds the cone axis parallel to the transmitter axis.

In Fig. 10 is shown a variant construction in which the indicator constitutes a continuous indicator or charting mechanism. Like numerals designate like parts. In this figure it will be seen that the coil 9 consisting of the two sections 161 is bridged with sections 163 of a coil 165 in a recording meter. The meter has rotary means 167 for supporting a renewable paper chart 169 upon which operates a marker 171 of a rocking arm 173. The arm 173 is pivoted at 175 and is linked to a connecting rod 177. The rod 177 is in turn linked with a rocker 179 on a fulcrum 181. The opposite end of the rocker 179 is connected to an armature 183 by means of the member 185. Measuring movement of armature 23 in the transmitter 1 is proportionally transmitted to the armature 183 by inductive re-orientations in the bridge circuit.

A motor 187 through a gear reduction drive 189 drives a shaft 191 which rotates the member 167 carrying the chart 169. The supply circuit 193 of the motor 187 is closed by a pressure switch 195 in the supply line 102. Thus whenever the air is turned on at the valve 97, the switch 195 closes the circuit 193 of the motor 187 to start rotating the chart 169. Hence the chart is not started until the transmitter shown in Fig. 1 is in measuring position in a barrel with air pressure applied to the feeler balls. This avoids unnecessary marking on the chart when measurements are not being taken, as would be the case if the motor 187 were operating continuously.

Advantages of the invention are as follows:

Motion of the armature 23 is linearly proportional to the relative radial movements of the feeler ball train. This is not strictly true of apparatus such as shown in the Roberts patent, since therein the armature displacements are in non-linear proportion, the proportion depending upon the radial positions of the feeler arms.

The actual feelers in the present device tend to roll in making measurements, which is conducive to ease of operation and preservation of accuracy. That is, the transmitter may be drawn through the tube with the air pressure on the piston, and thus a continuous measurement is possible. In other types of apparatus available, an intermittent measurement only was possible.

With an even number of balls in a radial train, such as balls 67 and 69 in Figs. 5 and 3, the transmitter is intended to move in the direction of the nose end 29; with an uneven number of balls in a radial ball train, the transmitter is intended to be pushed in a direction away from its nose end. This is to provide a de-clutching tendency on the cone by the rotation of the innermost ball which contacts the cone. Thus, a free and accurate rolling measuring action is assured.

In addition, the feeler pressure is independent of human variations, because it depends upon regulated air pressure. The feeler pressure is also remotely releasable at will which is untrue of spring-pressed feelers. It should be noted that the spring 41 in the present case does not bring about feeler pressure, but merely effects a release of the cone 39 from the feelers when the air is turned off.

It is not necessary to maintain a concentric relationship between the outside of the body 1 and the cone 39, since the axial position of the cone within the body 1 depends within practical limits only upon the relative positions of the feeler-ball trains. Thus the transmitter may be sent through a barrel horizontally or vertically with equally good results, and without care for centering.

The device may be adapted for various conditions simply by changing bushings in the cylinder 27.

It will be understood that the invention is equally applicable, in addition to measuring the insides of gun barrels and recoil barrels, to measuring oil still tubes, boiler tubes, and various kinds of pipe in general.

If interchangeability is desired, in the transmitter of Figs. 3 and 5 a threaded opening could be arranged opposite one of the bushings 113 for the bushing 49 of Figs. 2 and 4, and this opening closed by a blind plug. This would make all of the bushings interchangeable on a given transmitter.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Measuring apparatus comprising a guide body, openings peripherally spaced about the body, trains of feeler balls associated with said openings and extending exteriorly from the body to the exterior, the feeler balls in at least one opening being radially movable, an axially located cone between the peripheral balls, a pressure platen having a plane perpendicular to the axis of said cone, a bearing associated with the cone and cooperating with the flat surface of said platen to allow for lateral movement, a retriever spring reacting from the body against the cone to bias it toward the platen, an air cylinder carried by said body, and a sliding plunger having a sealing engagement with said cylinder and carrying said platen.

2. Measuring apparatus comprising a guide body, openings peripherally spaced about the body, trains of feeler balls in said openings and extending exteriorly from the body, the feeler balls in at least one opening being radially movable, an axially located cone between the peripherally spaced balls and contacting at least one ball, a pressure platen having a plane perpendicular to the axis of said cone, a bearing associated with the cone and cooperating with the flat surface of said platen to allow lateral movement, a retriever spring reacting from the body against the cone to bias it toward the platen, an air cylinder carried by said body, a sliding plunger having a sealing engagement with said cylinder and carrying said platen, an electromagnetic coil located around said cylinder, and a magnetic armature attached to said plunger and carried in said cylinder.

3. Measuring apparatus comprising a guide body, openings peripherally spaced about the body, feeler balls in said openings and extending exteriorly from the body, the feeler balls in at least one opening being radially movable, an axially located cone between the peripherally spaced balls and contacting at least one feeler ball, an air cylinder carried by said body, a sliding plunger having a sealing engagement with said cylinder and connected to the cone, an electromagnetic coil located around said cylinder, a magnetic armature attached to said plunger and carried in said cylinder, and means for adjusting said coil on said cylinder from the exterior of the guide body.

4. Measuring apparatus comprising a sliding body, openings peripherally spaced about the body, trains of feeler balls associated with said openings and extending exteriorly from the body, the feeler balls of one opening being radially movable, an axially located cone between the peripherally spaced balls and contacting at least an inwardly moving ball, a pressure platen having a plane perpendicular to the axis of said cone, a bearing associated with the cone and cooperating with the flat surface of said platen to allow lateral movement, a retriever spring reacting from the body against the cone to bias it toward the platen, an air cylinder carried by said body, a sliding plunger having a sealing engagement with said cylinder and carrying said platen, an electromagnetic coil located around said cylinder, a magnetic armature attached to said plunger and carried in said cylinder, and adjustment means for axially positioning the coil with respect to the cylinder.

5. A measuring instrument for gun barrels and the like having interior grooves and lands, comprising an elongate guide body adapted to be inserted into the barrel, oppositely located bushings in said body, feeler balls in the bushings and extending from the body, at least one feeler ball in one bushing being relatively radially movable with respect to the other, a second and interior feeler ball carried by the bushing which carries the movable ball, an axially sliding cone within the body and contacted by said last-named ball, a plurality of additional bushings in said body, radially movable balls respectively in said last-named bushings and contacted by said cone, and stops for said last-named balls preventing their outward movement into engagement with a barrel.

6. A measuring instrument for gun barrels and the like having lands and grooves comprising a guide body movable through the barrel, a bushing in the body carrying a linearly fixed but rotary ball, an oppositely located bushing in the body carrying a stepped opening, a feeler ball train in said opening and movable radially but being limited in outward movement, two other bushings carried by the body, said other bushings having radial openings, fixed rotary balls in said last-named openings, and an axially movable cone within the body and contacting said last-named balls and the innermost one of said feeler balls.

7. A measuring instrument for cylinders comprising a guide body insertable loosely into the cylinder, at least three bushings extending radially from the body in a plane, each bushing having a radial stepped opening therethrough, a feeler ball in the last step, the outermost opening being formed to limit the outward motion of said feeler ball, a train of balls reaching from the outermost step through the other steps, and an axially movable cone within said body and contacting the innermost ball of the train.

8. A measuring instrument for cylinders comprising a guide body insertable loosely into the cylinder, at least three bushings extending radially from the body in a plane, each bushing having a radial stepped opening therethrough, a feeler ball in the outermost step, the outermost opening being formed to limit the outward motion of said feeler ball, a train of balls reaching from the outermost step through the other steps, and an axially movable cone within said body and contacting the innermost ball, said steps in each bushing respectively increasing in size inwardly, and each ball being only slightly smaller than its respective step of the opening.

9. Measuring apparatus comprising a guide body, openings peripherally spaced about the body, feeler means in said openings and extending exteriorly from the body, the feeler means in at least one opening being radially movable inward, an axially movable cone located between the feeler means, means for biasing the cone with a force directed from its large end to its small end and between said feeler means, an armature in the guide body, electrical means cooperating with said armature to transmit a signal in accordance with armature movement, and a connection between said cone and the armature for axially driving the armature from the cone in direct phase with axial cone movement while allowing free relative lateral movements of the cone.

10. Measuring apparatus comprising a guide body, openings peripherally spaced about the body, feeler means in said openings and extending exteriorly from the body, the feeler means in at least one opening being radially movable inward, an axially movable cone located between the feeler means, means for biasing the cone with a force directed from its large end to its small end and between said feeler means, an armature in the guide body, electrical means cooperating with said armature to transmit a signal in accordance with armature movement, and a connection between said cone and the armature for axially driving the armature from the cone in direct phase with axial cone movement while allowing free relative lateral movements, said connection comprising an abutment between the cone and the armature having a flat contact surface perpendicular to the axis of the cone.

11. Measuring apparatus comprising a mechanical transmitter for insertion into a tube, feeler means movable radially with respect to the transmitter and contacting the interior of the tube, air operated means for biasing the feeler means toward operating position, an armature movable with the air operated means, means comprising a portion of an inductive bridge circuit carried by said transmitter and inductively cooperating with said armature, a recording instrument having a movable chart and marker, inductive coil means in said instrument and forming a part of said bridge circuit, a receiving armature movable in said last-named coil means, a mechanism connecting the receiving armature and said marker in said instrument, a movable record adapted to be marked by said marker, means driving said record, and means responsive to the application of said air pressure to the transmitter for starting said driving means and for stopping it when the air pressure is cut off.

12. Measuring apparatus comprising a body of a size for loose insertion into a tube to be internally measured, openings peripherally spaced about the body, peripherally spaced tube-contacting balls in said openings, said balls extending exteriorly from the body and being movable outward and inward in response to diametrical irregularities in the tube, an axially located cone within and contacting the spaced balls, an axially movable member supported by the body, air pressure means adapted to move the cone between the angularly spaced balls to bias them outward, said cone being located axially according to the positions of the balls relative to one another, and connecting means between the pressure means and the cone allowing substantially unrestrained lateral movement of the body and pressure means held thereby in reference to any lateral position of the cone, as determined by the balls, without thereby transmitting any substantial axial motion to the pressure means.

FOSTER M. POOLE.